United States Patent [19]

Katsumata et al.

[11] Patent Number: 5,502,093
[45] Date of Patent: Mar. 26, 1996

[54] POLYACETAL RESIN COMPOSITION

[75] Inventors: Toru Katsumata; Nobuyuki Matsunaga, both of Shizuoka, Japan

[73] Assignee: Polyplastics Co., Ltd., Japan

[21] Appl. No.: 345,697

[22] Filed: Nov. 21, 1994

[30] Foreign Application Priority Data

Nov. 30, 1993 [JP] Japan .................... 5-299936

[51] Int. Cl.⁶ .................. C08K 5/34; C08K 5/07
[52] U.S. Cl. .................. 524/91; 524/96; 524/99; 524/100; 524/102; 524/359; 524/377; 524/512; 524/593
[58] Field of Search .................. 524/91, 100, 359, 524/593, 96, 99, 102, 377, 512

[56] References Cited

U.S. PATENT DOCUMENTS

| | | | |
|---|---|---|---|
| 4,351,916 | 9/1982 | Kohan | 524/593 |
| 4,446,263 | 5/1984 | Bryant | 524/91 |
| 4,975,478 | 12/1990 | Okuda | 524/99 |
| 5,118,734 | 6/1992 | Katsumata | 524/102 |
| 5,149,723 | 9/1992 | Hayes | 524/99 |
| 5,208,279 | 5/1993 | Katsumata | 524/100 |
| 5,212,222 | 5/1993 | Mitsuuchi et al. | 524/593 |
| 5,258,431 | 11/1993 | Katsumata et al. | 524/100 |

FOREIGN PATENT DOCUMENTS

| | | |
|---|---|---|
| 57-98545 | 6/1982 | Japan . |
| 59-133245 | 7/1984 | Japan . |
| 60-195155 | 10/1985 | Japan . |
| 61-47744 | 3/1986 | Japan . |

*Primary Examiner*—Tae Yoon
*Attorney, Agent, or Firm*—Nixon & Vanderhye

[57] ABSTRACT

Polyacetal resin compositions have excellent weather resistance and environment resistance, which suppress resin deterioration/discoloration, crack and discoloration caused by additive bleeding during extended exposure to light while maintaining the initial molded product surface condition. The polyacetal compositions include a blend of (A) 100 parts by weight of a polyacetal resin, with the specific amounts of (B) an acrylic resin, (C) an oxyalkylene polymer having chains of 2 to 8 consecutive carbon atoms, (D) a UV absorber and (E) two kinds of the hindered amine compounds each having a different molecular weight.

8 Claims, No Drawings

POLYACETAL RESIN COMPOSITION

FIELD OF THE INVENTION

The present invention relates to polyacetal resin compositions having excellent weather (light) resistance properties. More specifically, an acrylic series resin, a specific oxyalkylene polymer, a UV absorber and two kinds of specific hindered amine series light stabilizers are used in combination a polyacetal resin to provide a polyacetal resin composition having very excellent weather resistance and environment resistance, which suppresses resin deterioration/discoloration and crack formation due to light exposure over an extended period of time and discoloration caused by additive bleeding. The initial molded product surface condition is thereby maintained.

BACKGROUND OF THE INVENTION

As is well known, in recent years, polyacetal resin has been utilized in a very wide field as an engineering resin due to its excellent physical characteristics such as its mechanical and electrical properties chemical characteristics such as its chemical and heat resistance properties. However, expansion of the field in which the polyacetal resin is utilized is sometimes accompanied with further requirements of specific material property changes. Further improvement in weather (light) resistance is desired as one of such specific properties. That is, the environment in which the interior and exterior parts for automobiles and the parts for electric appliances are used (e.g., sun light, humidity due to rain and dew and aerial contaminants causes discoloration of molded product surfaces and gloss reduction attributable to loss of a surface flatness. In addition, such an environment generates cracks on the surfaces of such parts thereby causing in some cases damaged appearances.

This necessitates the use of a composition blended with various anti-weather stabilizers when the polyacetal resin is used for parts exposed to sun light. Various blends of anti-weather stabilizers are known. For example, there are proposed combined use of a hindered amine series light stabilizer and various UV absorbers (JP-A-57-98545, JP-A-59-133245, JP-A-60-195155 and JP-A-61-36339) and combined use of various UV absorbers, aliphatic ester and a hindered amine series light stabilizer (JP-A-61-47744).

However, the methods with these stabilizers can not necessarily be satisfied, and in order to maintain a weather (light) resistance over a long period of time, a large number of such stabilizers must be added. Since polyacetal resin is a high crystalline polymer, the additives tend to "bleed" onto the surface of the molded parts due to recrystallization caused by heat and temperature differences in the ambient environment. This in turn, causes discoloration and gloss reduction on the molded product surfaces which appears to be the same action as resin deterioration. In particular, the surface appearance of automobile interior parts which are used in very high temperature or high humidity environments may become damaged in spite of the part being formed of a polyacetal resin with improved heat resistance.

Accordingly, there is a need for to be developed between "material" and "which" a polyacetal resin material which is free of additive surface bleeding and maintains a molded product appearance over a prolonged time periods, while also maintaining weather (light) resistance properties.

SUMMARY OF THE INVENTION

According to the present invention, polyacetal resin compositions are provided which can suppress surface discoloration caused by additive surface-bleeding, and maintain an initial molded product surface status over a long period of time and excellent weather (light) resistance without sacrificing the inherent characteristics of the polyacetal resin have resulted in coming to complete the present invention.

More specifically, the present invention relates to a polyacetal resin composition prepared by blending:

(A) 100 parts by weight of a polyacetal resin, with (B) 0.1 to 30 parts by weight of an acrylic series resin, (C) 0.1 to 10 parts by weight of an oxyalkylene polymer having chains of 2 to 8 consecutive carbon atoms, (D) 0.01 to 2.0 parts by weight of a UV absorber, and (E) 0.01 to 1 part by weight of a low-molecular hindered amine series substance (E-1) having a molecular weight of less than 700 and 0.01 to 4 parts by weight of a high-molecular hindered amine series substance (E-2) having a molecular weight of 700 or more.

The invention provides, in other words, a polyacetal resin composition comprises (A) 100 parts by weight of a polyacetal resin, (B) 0.1 to 30 parts by weight of an acrylic resin, (C) 0.1 to 10 parts by weight of an oxyalkylene polymer having chains of 2 to 8 consecutive carbon atoms, (D) 0.01 to 2.0 parts by weight of a UV absorber, (E-1) 0.01 to 1 part by weight of a low molecular weight-having, hindered amine compound having a molecular weight of less than 700 and (E-2) 0.01 to 4 parts by weight of a high molecular weight-having, hindered amine compound having a molecular weight of 700 or more.

DETAILED DESCRIPTION OF THE PREFERRED EXEMPLARY EMBODIMENTS

The constitutional components of the present invention will be explained below in detail.

First of all, the polyacetal resin (A) used in the present invention is a high molecular compound having an oxymethylene group ($-CH_2O-$) as a primary constitutional component and may be any one of a polyoxymethylene homopolymer, a copolymer, a terpolymer and a block copolymer each having a little amount of the other constitutional components than the oxymethylene group. Further, the molecule thereof may have not only a linear but also branched or crosslinking structure. The polymerization degree thereof is not particularly limited.

Next, the acrylic series resin (B) used in the present invention includes homopolymers or copolymers of acrylic acid, acrylic ester (for example, methyl acrylate, ethyl acrylate, n-propyl acrylate, isopropyl acrylate, n-butyl acrylate, n-hexyl acrylate, and n-octyl acrylate), methacrylic acid, and methacrylic ester (for example, methyl methacrylate, ethyl methacrylate, n-propyl methacrylate, isopropyl methacrylate, n-butyl methacrylate, isobutyl methacrylate, n-amyl methacrylate, and n-octyl methacrylate). These copolymers may be either random copolymers or block copolymers, and there can be used as well a random-block copolymer prepared by adding one component for the random copolymer as a polymer block to the random copolymer. Further, there can be used as well those prepared by graft-copolymerizing the acrylic series resins themselves described above and the (co)polymers (for example, a core/shell polymer) having a spherical (particle) structure obtained by crosslinking the acrylic series resin.

Among them, preferably used are a methyl methacrylate homopolymer or a graft polymer comprising methyl methacrylate, a spherical (particle) substance, and a copolymer of methyl methacrylate and methacrylic acid alkyl ester in which the alkyl has a carbon number of 2 to 6 or a copolymer of methyl methacrylate and methacrylic acid alkyl ester in which the alkyl has a carbon number of 1 to 6. Particularly preferred are the methyl methacrylate homopolymer, the graft polymer comprising methyl methacrylate, and the copolymer of methyl methacrylate and methacrylic acid alkyl ester in which the alkyl has the carbon number of 2 to 6.

An addition amount of the acrylic acid series resin (B) is suitably 0.1 to 30 parts by weight (per 100 parts by weight of the polyacetal resin), particularly preferably 1 to 20 parts by weight. Less addition amount does not reveal a sufficient effect to a weather resistance, and uselessly excessive addition exerts an undesirable influence to a mechanical property and a heat stability.

Next, the examples of the oxyalkylene polymer (C) used in the present invention having chains of 2 to 8 consecutive carbon atoms include poly(ethylene oxide), poly(propylene oxide), poly(butylene-1,2-oxide), polyoxolane, polyoxane, polyoxepane, polyoxokane and polyoxonane and an ethylene oxide/propylene oxide copolymer, and an ethylene oxideooxolane copolymer. Herein, the copolymer means a random copolymer, a block copolymer, a graft copolymer and the mixture thereof. The oxyalkylene polymer used has a molecular weight (number average) of 500 to 200,000, preferably 2,000 to 50,000. Among them, the oxyalkylene polymer having chains of 2 to 8 consecutive carbon atoms is preferred and includes poly(ethylene oxide), poly(propylene oxide), poly(butylene-1,2-oxide), polyoxolane and the ethylene oxideopropylene oxide copolymer. More preferred are poly(ethylene oxide), poly(propylene oxide) and the ethylene oxide/propylene oxide copolymer.

The addition amount of the oxyalkylene polymer (C) used herein is suitably 0.1 to 10 parts by weight, particularly preferably 0.3 to 5 parts by weight per 100 parts by weight of the polyacetal resin. The amount less than 0.1 part by weight provides a small effect of improving the weather resistance, and the amount more than 10 parts by weight saturates an improving effect to exert an adverse influence to the intrinsic characteristics of the polyacetal resin.

The UV (ultraviolet rays) absorber (D) used in the present invention includes a benzotriazole series substance, a benzophenone series substance, an aromatic benzoate series substance, a cyanoacrylate series substance, and an oxalic anilide series substance. Of them, the benzotriazole series substance and/or the benzophenone series substance are preferred. The examples of the particularly preferred substances include the following ones.

That is, the benzotriazole series substance includes 2-(2'-hydroxy-5'-methyl-phenyl)benzotriazole, 2-(2'-hydroxy-3',5'-di-t-butyl-phenyl)benzotriazole, 2-(3,5-di-t-amyl-2-hydroxyphenyl)benzotriazole, 2-(2'- hydroxy-3',5'-di-isoamyl-phenyl)benzotriazole, 2-[2-hydroxy-3,5-bis-(a,a-dimethylbenzyl)phenyl] benzotriazole, and 2-(2'-hydroxy-4'-octoxyphenyl)benzotriazole. The benzophenone series substance includes 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and 2-hydroxy-4-oxybenzylbenzophenone.

A blending amount of the UV absorber (D) used herein is suitably 0.01 to 2 parts by weight (per 100 parts by weight of the polyacetal resin), particularly preferably 0.05 to 1 part by weight. In the case where the component (D) is too little, an effect can not be expected, and uselessly too much addition not only is economically disadvantageous but also results in bringing about the problems such as reduction in a mechanical property and stain of a die.

While a weather (light) resistance can be pretty improved by blending the polyacetal resin (A) with the acrylic resin (B), the oxyalkylene polymer (C) having chains of 2 to 8 consecutive carbon atoms and the UV absorber (D), it is still insufficient in the presence of intensive light or heat energy, and an increased amount of the anti-weather resistance stabilizer can not allow the improvement in the weather resistance to be expected for the amount. Bleeding of the stabilizer is observed in an environmental condition such as an inside of an automobile, in which a temperature difference is relatively large and bedewing is liable to take place, by using a lot of the anti-weather stabilizer. It is accumulated on a molded product surface and causes change (whitening) on the surface and gloss reduction, which results in damaging an initial surface condition.

Accordingly, the present invention is characterized by using two kinds having the different molecular weights as the hindered amine series substance and blending them into the polyacetal resin (A) in combination with the three components of (B), (C) and (D) each described above, and such blending provides the polyacetal resin composition which has an excellent weather resistance and in which discoloration and gloss reduction on a surface of a molded product caused by bleeding originating in a stabilizer such as a hindered amine series substance are suppressed and an initial surface condition can be maintained even under a light exposing environment over a long period of time.

In two kinds of the hindered amine series substances (E) with the different molecular weights used for such purposes, one is the low-molecular hindered amine series substance (E-1) having the molecular weight of less than 700 and another is the high-molecular hindered amine series substance (E-2) having the molecular weight of 700 or more. In the present invention, at least one kind thereof is used in combination.

The examples of the low molecular hindered amine series substance (E-1) having the molecular weight of less than 700 used herein include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4piperidyl)malonate, bis(2,2,6,6-tetramethyl-4piperidyl)adipate, bis(2,2,6,6-tetramethyl-4piperidyl)sebacate, bis(1,2,2,6,6-pentamethylpiperidyl)sebacate, bis(2,2,6,6-tetramethyl-4-piperidyl)terephthate, 1,2-bis(2,2,6,6-tetramethyl-4-piperidyloxy)ethane, bis(2,2,6,6-tetramethyl-4-piperidyl)hexamethylene-1,6-dicarbamate, bis(1- methyl-2,2,6,6-tetramethyl-4-piperidyl)adipate, and tris(2,2,6,6-tetramethyl-4-piperidyl)benzene-1,3,5-tricarboxylate.

Preferred is the hindered amine series substance having the molecular weight of 600 or less, and bis(2,2,6,6-tetramethyl-4-piperidyl)sebacate and bis(1-methyl-2,2,6,6-tetramethyl-4-piperidyl)adipate are preferably used.

Next, the examples of the high-molecular hindered amine series substance (E-2) having the molecular weight of 700 or more include tetrakis-(2,2,6,6-tetramethyl-4-piperidyl)1,2,3, 4-butan-etetracarboxylate, tetrakis(N-methyl-2,2,6,6-tetramethyl-4-piperidyl)1,2,3,4-butanetetracarboxylate, 1-[2-{3-(3,5-di-t-butyl-4-hydroxyphenyl)propionyloxy)ethyl]-4-{ 3-(3,5-di-t-butyl-4-hydroxyphenyl)propionyloxy}-2,2,6,6-tetramethylpiperidine, or a piperidine derivative condensation product, for example, a dimethyl succinate-1-(2-hydroxyethyl)-4-hydroxy-2,2,6,6-tetramethylpiperidine polycondensation product, poly[{6-(1,1,3,3-tetramethylbutyl)amino-1,3,5-triazine-2,4-diyl} {(2,2,6,6-tetramethyl-4-piperidyl)imino} hexamethylene{(2,2,6,6-tetramethyl-4-piperidyl)imino} ](molecular weight: 2500 or more), and poly[(6-morpholino-s-triazine-2,4-diyl)(2,2,6,6-tetramethyl-4-piperidyl)imino] hexamethylene[(2,2,6,6-tetramethyl-4-piperidyl)imino] (molecular weight: 1400 to 1700).

Preferred is the high-molecular hindered amine series substance having the molecular weight of 1000 or more, and preferably used are poly[ (6-morpholino-s-triazine-2,4-diyl)(2,2,6,6-tetramethyl-4-piperidyl)imino] hexamethylene [(2,2,6,6-tetramethyl-4-piperidyl)imino] (molecular weight: 1400 to 1700) and the dimethyl succinate-1-(2-hydroxyethyl)-4-hydroxy2,2,6,6-tetramethylpiperidine polycondensation product (molecular weight: 3000 or more).

The addition amounts of the hindered amine series substance (E) used herein are suitably 0.01 to 1.0 part by weight (per 100 parts by weight of the polyacetal resin) for the low-molecular substance (E-1) having the molecular weight of less than 700 and 0.01 to 4.0 parts by weight for the high-molecular substance (E-2) having the molecular weight of 700 or more. The total amount of two kinds of the hindered amine series substances is suitably 0.02 to 5.0 parts by weight. In particular, preferred are 0.02 to 1 part by weight for (E-1) and 0.03 to 1.5 part by weight for (E-2). The ratio of (E-1) to (E-2) is preferably 1:0.5 to 1:3. In the case where these components are too little, an effect can not be expected, and too large addition causes bleeding and results in damaging an initial mold surface condition which is the purpose of the present invention. In particular, too large addition of the low-molecular hindered amine series substance (E-1) not only increases bleeding and discoloration and makes a surface notably inferior but also provides the problems such as reduction in a mechanical property and stain of a die (so-called mold deposit).

Two kinds of such hindered amine series substances (E) having the different molecular weights are used in combination with the. UV absorber (B) to provide a sufficient effect for improving a weather resistance, particularly prevention of cracks on a molded product surface and prevention of discoloration on the molded product surface caused by extended exposure.

Such action effect is considered as follows. First, the hindered amine series substance scavenges and stabilizes a radical generated on a molded product surface by influence of light and heat. Hindered amine on the surface is deactivated by extended irradiation of light but hindered amine scattered in the inside is bleeded on the surface by temperature change. While this leads to light stabilization, a molded product surface is discolored since as described above, a bleeding amount of the low-molecular substance having a high volatility is too much. Meanwhile, since the high-molecular substance having a low volatility has a too late bleeding rate, the molded product surface is subjected to light deterioration.

The results obtained by evaluating various bleeding amounts and discoloring levels lead to considering that combined use of the hindered amine series compounds having the molecular weights of more or less than 700 with the molecular weight of 700 set as a boundary suppresses discoloration caused by bleeding and provides an excellent weather resistance against extended light exposure.

The coloring component (F) can further be blended with the composition of the present invention to obtain a colored molded product which does not need a plating layer and a coating layer. Various dyes and pigments are used as the coloring component. For example, anthraquinone series dyes are preferred as the dye, and preferred as the pigment are an azo series, a phthalocyanine series, a perylene series, a quinacdorine series, an anthraquinone series, an indoline series, a titanium series, an iron oxide series and a cobalt series as well as carbon black. These coloring components may be used singly or in combination of two or more kinds.

Particularly in the case where carbon black is added as the coloring component, it provides an effect to further improve an anti-weather stability. There can be used as the carbon black, those which are usually used for coloring plastics, for example, Micronex, Acetylene Black and Kötchen Black.

In the composition of the present invention, a blending amount of this coloring component resides preferably in the range of 0.1 to 4 parts by weight, particularly preferably 0.2 to 2 parts by weight per 100 parts by weight of the polyacetal resin. This blending amount of less than 0.1 part by weight does not sufficiently reveal a coloring effect. The amount of the coloring component of more than 4 parts by weight is not required to blend, and the excessive blending amount rather reduces the physical properties and a heat stability of the composition.

A colored molded product obtained by adding the coloring component (F) to the components (A) to (E) can suppress light degradation and discoloration and gloss reduction caused by bleeding of a stabilizer and maintain an initial color and gloss level under an environment of extended exposure to light.

Further, various publicly known stabilizers are preferably added to the composition of the present invention to strengthen a heat stability, and for this purpose, publicly known anti-oxidation agents, nitrogen-containing compounds, alkaline or alkaline earth metal compounds are preferably used in combination of one kind or two or more kinds. Further, in order to provide the composition of the present invention with the desired characteristics according to the purposes, there can be added and incorporated one kind or two or more kinds of the publicly known additives, for example, a sliding agent, a nucleus agent, a releasing agent, an anti-static agent, other surface active agents, an organic high molecular material, and inorganic or organic, fibrous, powdery or tabular fillers.

In general, the composition of the present invention can be prepared with the facilities and processes which are publicly known as the production processes for a synthetic resin composition. That is, the needed components are mixed and kneaded with a single shaft or double shaft extruder and can be molded after extruding to make pellets for molding. Further, it is possible as well to prepare the composition simultaneously with molding with a molding machine. There is possible any one such as a process in which in order to improve dispersing and mixing of the respective components, a part or all of a resin component is pulverized and mixed to mold pellets by melting and extruding.

The blending substances such as the stabilizers and the additives each described above may be added at any arbitrary stage and can naturally be added and mixed immediately before obtaining a finished molded product.

The resin composition according to the present invention can be molded with any of extruding molding, injection molding, pressing molding, vacuum molding, blowing molding and foaming molding.

As apparent from the above explanations and the examples, the composition of the present invention prepared by blending the polyacetal resin with the acrylic series resin, the specific oxyalkylene polymer, the UV absorber and two kinds of the hindered amine series substances showed a notable effect of markedly improving a weather resistance while maintaining an initial surface condition of a polyacetal molded product.

Accordingly, the composition of the present invention can suitably be used for the applications such as automobile interior products (for example, a regulator handle, an interior clip and a ventilator knob), an outer handle for an automobile, a key top for a key board, an optical machinery, a construction material and a household product while making the best use of the characteristic of the excellent weather (light) resistance thereof.

EXAMPLES

The present invention will be explained below with reference to the examples but the present invention will not be limited thereto. "Part" used in the examples and the comparative examples represents part by weight. As follows are the methods used for evaluating a surface condition and the characteristic values of the mechanical properties in the examples.

(1) Weather Resistance Test (1) A test was carried out in the following bright/dark cycle conditions with a xenon weather meter (model: XEL-2WN manufactured by Suga Tester Co., Ltd.):

Light irradiation: 3.8 hrs/89° C., 50 % RH

Dark : 1.0 hr/38° C., 95 % RH (2) Extended sun light exposure was carried out according to an under-glass exposing (a complete sealing system) test in Okinawa.

Change in a surface condition and crack generating time were evaluated in the above test.

(a) Crack generating time:

A test piece was exposed in the prescribed conditions, and the presence of crack generation on a test piece surface was observed with a loupe of 10 magnifications to determine the crack generating time with the time when crack was first observed. A larger value shows a better result. (b) Changes-1 and 2 in a surface condition (confirmation of a bleeding status):

A test piece was exposed in the prescribed conditions for fixed time, and change in a hue, gloss change and a situation in a crack of the test piece before and after exposing were observed to classify the degrees of the changes to five grades. A smaller numeral means less change, that is, less discoloration and gloss change and less generation of cracks. Change in the surface condition was evaluated at two stages shown below:

1. The test piece after an exposing processing was observed and evaluated as it was.
2. In order to remove a discoloration factor attributable to bleeding, the test piece after the exposing processing was cleaned with a wet cloth and then was observed and evaluated.

That is, in the case where a point is high at the change-1 of the surface condition and the point is low at the change-2 of the surface condition, the discoloration factor attributable to bleeding is considered to be large, and in the case where the points are high at both of the change-1 and the change-2, deterioration attributable to a weather resistance is considered to be a primary factor.

(2) Tensile Test

A tensile strength was measured according to ASTM D638.

EXAMPLES 1 TO 17 AND COMPARATIVE EXAMPLES 1 TO 20

The acrylic series resin (B), the oxyalkylene polymer (C), the UV absorber (D), two kinds of the hindered amine series substances (E) and according to necessity, the coloring component (F) were blended with the polyacetal resin (A) (Dulacon/brand name, manufactured by Polyplastics Co., Ltd.) in the composition shown in Table 1. After mixing with a Hönschel mixer, the mixture was melted and kneaded with a 30 mm double shaft extruder to prepare a pelletized composition. Then, a test piece was molded from this pellet with an injection molding machine in the molding conditions described above, and a weather resistance and the other characteristics were measured and evaluated. The results thereof are shown in Table 1.

For sake of comparison, those in which one of the components (B) to (E) was removed were prepared and evaluated in the same manners. The results are shown in Table 2.

TABLE 1

|  |  | Examples | | | | | | | | |
|---|---|---|---|---|---|---|---|---|---|---|
|  |  | 1 | 2 | 3 | 4 | 5 | 6 | 7 | 8 | 9 |
| (A) Polyacetal resin | (parts by weight) | 100 | 100 | 100 | 100 | 100 | 100 | 100 | 100 | 100 |
| (B) Acrylic series | Note-1 | B-1 | B-1 | B-1 | B-1 | B-1 | B-1 | B-1 | B-1 | B-1 |
| resin | (parts by weight) | 5 | 5 | 5 | 10 | 10 | 10 | 10 | 10 | 10 |
| (C) Oxyalkylene | Note-2 | C-1 | C-1 | C-1 | C-1 | C-1 | C-1 | C-1 | C-1 | C-1 |
| polymer | (parts by weight) | 1 | 2 | 2 | 2 | 2 | 2 | 5 | 5 | 5 |
| (D) UV absorber | Note-3 | D-1 | D-1 | D-1 | D-1 | D-1 | D-1 | D-1 | D-1 | D-1 |
|  | (parts by weight) | 0.6 | 0.6 | 0.6 | 0.6 | 0.6 | 0.3 | 0.6 | 0.6 | 0.6 |
| (E) Hindered amine | Note-4 | E-1 | E-1 | E-1 | E-1 | E-1 | E-1 | E-1 | E-1 | E-1 |
| series substance | (parts by weight) | 0.3 | 0.3 | 0.2 | 0.3 | 0.2 | 0.2 | 0.3 | 0.3 | 0.3 |
|  | Note-5 | E-3 | E-3 | E-3 | E-3 | E-3 | E-3 | E-3 | E-4 | E-5 |
|  | (parts by weight) | 0.3 | 0.3 | 0.5 | 0.3 | 0.5 | 0.5 | 0.3 | 0.3 | 0.3 |
| (F) Colorant | Note-6 |  |  |  |  |  |  |  |  |  |
|  | (parts by weight) |  |  |  |  |  |  |  |  |  |

TABLE 1-continued

|  |  |  |  |  |  |  |  |  |  |  |
|---|---|---|---|---|---|---|---|---|---|---|
| Weather | Crack generating time (Hrs) | | 900 | 960 | 1080 | 1200 | 1260 | 1200 | 1400 | 1260 | 1400 |
| resis- | Surface | 500 hr irradation | 1 | 1 | 1 | 1 | 1 | 1 | 1 | 1 | 1 |
| tance | condition 1 | 1000 hr irradation | 2 | 1 | 1 | 1 | 1 | 1 | 1 | 1 | 2 |
| test 1 | Surface | 500 hr irradation | 1 | 1 | 1 | 1 | 1 | 1 | 1 | 1 | 1 |
|  | condition 2 | 1000 hr irradation | 2 | 1 | 1 | 1 | 1 | 1 | 1 | 1 | 1 |
| Weather | Crack generating time (month) | | 10 | 11 | 11 | 12 | >12 | 12 | >12 | 12 | 12 |
| resis- | Surface | 6 month irradiation | 1 | 1 | 1 | 1 | 1 | 1 | 1 | 1 | 1 |
| tance | condition 1 | 12 month irradiation | 2 | 2 | 1 | 1 | 1 | 1 | 1 | 1 | 2 |
| test 2 | Surface | 6 month irradiation | 1 | 1 | 1 | 1 | 1 | 1 | 1 | 1 | 1 |
|  | condition 2 | 12 month irradiation | 2 | 2 | 1 | 1 | 1 | 1 | 1 | 1 | 2 |
| Tensile | Yield strength (kg/cm$^2$) | | 596 | 590 | 595 | 606 | 602 | 610 | 580 | 582 | 580 |
| test | Elongation (%) | | 48 | 55 | 54 | 43 | 40 | 44 | 67 | 67 | 65 |

|  |  |  | Examples | | | | | | | |
|---|---|---|---|---|---|---|---|---|---|---|
|  |  |  | 10 | 11 | 12 | 13 | 14 | 15 | 16 | 17 |
| (A) Polyacetal resin | (parts by weight) | | 100 | 100 | 100 | 100 | 100 | 100 | 100 | 100 |
| (B) Acrylic series | Note-1 | | B-1 | B-1 | B-1 | B-2 | B-2 | B-1 | B-1 | B-1 |
| resin | (parts by weight) | | 10 | 10 | 10 | 10 | 10 | 20 | 5 | 10 |
| (C) Oxyalkylene | Note-2 | | C-1 | C-2 | C-2 | C-2 | C-1 | C-1 | C-1 | C-1 |
| polymer | (parts by weight) | | 5 | 5 | 5 | 5 | 5 | 5 | 2 | 5 |
| (D) UV absorber | Note-3 | | D-1 | D-1 | D-2 | D-1 | D-1 | D-1 | D-1 | D-1 |
|  | (parts by weight) | | 0.6 | 0.6 | 0.6 | 0.6 | 0.6 | 0.6 | 0.6 | 0.6 |
| (E) Hindered amine | Note-4 | | E-2 | E-1 | E-1 | E-1 | E-1 | E-1 | E-1 | E-1 |
| series substance | (parts by weight) | | 0.3 | 0.3 | 0.3 | 0.3 | 0.3 | 0.3 | 0.3 | 0.3 |
|  | Note-5 | | E-4 | E-3 | E-3 | E-3 | E-3 | E-3 | E-3 | E-3 |
|  | (parts by weight) | | 0.3 | 0.3 | 0.3 | 0.3 | 0.3 | 0.3 | 0.3 | 0.3 |
| (F) Colorant | Note-6 | |  |  |  |  |  |  | F-1 | F-1 |
|  | (parts by weight) | |  |  |  |  |  |  | 0.5 | 0.5 |
| Weather | Crack generating time (Hrs) | | 1200 | 1320 | 1200 | 1140 | 1320 | >1400 | 1080 | >1400 |
| resis- | Surface | 500 hr irradation | 1 | 1 | 1 | 1 | 1 | 1 | 1 | 1 |
| tance | condition 1 | 1000 hr irradation | 1 | 1 | 1 | 1 | 1 | 1 | 1 | 1 |
| test 1 | Surface | 500 hr irradation | 1 | 1 | 1 | 1 | 1 | 1 | 1 | 1 |
|  | condition 2 | 1000 hr irradation | 1 | 1 | 1 | 1 | 1 | 1 | 1 | 1 |
| Weather | Crack generating time (month) | | 11 | 11 | 10 | 10 | 12 | >12 | 12 | >12 |
| resis- | Surface | 6 month irradiation | 1 | 1 | 1 | 1 | 1 | 1 | 1 | 1 |
| tance | condition 1 | 12 month irradiation | 1 | 1 | 2 | 2 | 1 | 1 | 1 | 1 |
| test 2 | Surface | 6 month irradiation | 1 | 1 | 1 | 1 | 1 | 1 | 1 | 1 |
|  | condition 2 | 12 month irradiation | 1 | 1 | 2 | 2 | 1 | 1 | 1 | 1 |
| Tensile | Yield strength (kg/cm$^2$) | | 580 | 584 | 582 | 568 | 567 | 610 | 589 | 597 |
| test | Elongation (%) | | 66 | 59 | 58 | 58 | 74 | 28 | 51 | 53 |

TABLE 2

|  |  |  | Comparative Examples | | | | | | | | | |
|---|---|---|---|---|---|---|---|---|---|---|---|---|
|  |  |  | 1 | 2 | 3 | 4 | 5 | 6 | 7 | 8 | 9 | 10 |
| (A) Polyacetal resin | (parts by weight) | | 100 | 100 | 100 | 100 | 100 | 100 | 100 | 100 | 100 | 100 |
| (B) Acrylic series | Note-1 | | B-1 | B-1 | B-1 | B-1 | B-1 | B-1 | B-1 | B-1 | B-1 |  |
| resin | (parts by weight) | | 5 | 5 | 5 | 5 | 5 | 10 | 10 | 10 | 10 |  |
| (C) Oxyalkylene | Note-2 | | C-1 | C-1 | C-1 | C-1 | C-1 | C-1 | C-1 | C-1 | C-1 | C-2 |
| polymer | (parts by weight) | | 1 | 1 | 1 | 2 | 2 | 2 | 5 | 5 | 5 | 5 |
| (D) UV absorber | Note-3 | |  | D-1 | D-1 | D-1 | D-1 | D-1 | D-1 | D-1 | D-1 | D-1 |
|  | (parts by weight) | |  | 0.6 | 0.6 | 0.6 | 0.6 | 0.6 | 0.3 | 0.6 | 0.6 | 0.6 |
| (E) Hindered amine | Note-4 | | E-1 | E-1 |  | E-1 |  | E-1 |  | E-1 |  | E-1 |
| series substance | (parts by weight) | | 0.3 | 0.3 |  | 0.6 |  | 0.6 |  | 0.3 |  | 0.3 |
|  | Note-5 | | E-3 |  | E-3 |  | E-3 |  | E-3 |  | E-3 |  |
|  | (parts by weight) | | 0.3 |  | 0.3 |  | 0.6 |  | 0.6 |  | 0.3 |  |
| (F) Colorant | Note-6 | |  |  |  |  |  |  |  |  |  |  |
|  | (parts by weight) | |  |  |  |  |  |  |  |  |  |  |
| Weather | Crack generating time (Hrs) | | 780 | 780 | 660 | 1020 | 840 | 1260 | 960 | 1080 | 900 | 700 |
| resis- | Surface | 500 hr irradation | 1 | 1 | 2 | 2 | 1 | 2 | 1 | 1 | 1 | 2 |
| tance | condition 1 | 1000 hr irradation | 3 | 3 | 3 | 4 | 3 | 4 | 2 | 2 | 2 | 4 |
| test 1 | Surface | 500 hr irradation | 1 | 1 | 2 | 1 | 1 | 1 | 1 | 1 | 1 | 2 |
|  | condition 2 | 1000 hr irradation | 3 | 3 | 3 | 1 | 3 | 1 | 2 | 1 | 2 | 4 |
| Weather | Crack generating time (month) | | 8 | 8 | 7 | 12 | 8 | >12 | 10 | 11 | 10 | 7 |
| resis- | Surface | 6 month irradiation | 1 | 2 | 2 | 4 | 1 | 4 | 1 | 1 | 1 | 2 |
| tance | condition 1 | 12 month irradiation | 3 | 3 | 3 | 5 | 3 | 5 | 2 | 2 | 2 | 4 |
| test 2 | Surface | 6 month irradiation | 1 | 2 | 2 | 1 | 1 | 1 | 1 | 1 | 1 | 2 |
|  | condition 2 | 12 month irradiation | 3 | 3 | 3 | 2 | 3 | 1 | 2 | 2 | 2 | 4 |
| Tensile | Yield strength (kg/cm$^2$) | | 601 | 597 | 596 | 593 | 593 | 607 | 584 | 579 | 581 | 555 |
| test | Elongation (%) | | 50 | 48 | 47 | 57 | 58 | 44 | 71 | 70 | 68 | 88 |

TABLE 2-continued

| | | | Comparative Examples | | | | | | | | | |
|---|---|---|---|---|---|---|---|---|---|---|---|---|
| | | | 11 | 12 | 13 | 14 | 15 | 16 | 17 | 18 | 19 | 20 |
| (A) Polyacetal resin | (parts by weight) | | 100 | 100 | 100 | 100 | 100 | 100 | 100 | 100 | 100 | 100 |
| (B) Acrylic series resin | Note-1 | | B-1 | B-1 | B-1 | B-1 | B-1 | B-1 | B-2 | B-1 | B-1 | B-1 |
| | (parts by weight) | | 10 | 10 | 5 | 10 | 10 | 10 | 10 | 10 | 20 | 10 |
| (C) Oxyalkylene polymer | Note-2 | | | C-1 | C-1 | C-1 | C-1 | C-2 | C-2 | C-2 | C-1 | C-1 | C-1 |
| | (parts by weight) | | | 5 | 5 | 5 | 5 | 5 | 5 | 5 | 5 | 2 | 5 |
| (D) UV absorber | Note-3 | | D-1 | D-1 | D-1 | D-1 | D-1 | D-2 | D-1 | D-1 | D-1 | D-1 |
| | (parts by weight) | | 0.6 | 0.6 | 0.6 | 0.6 | 0.6 | 0.6 | 0.6 | 0.6 | 0.6 | 0.6 |
| (E) Hindered amine series substance | Note-4 | | E-1 | | | E-2 | E-1 | E-1 | E-1 | E-1 | E-1 | E-1 |
| | (parts by weight) | | 0.3 | | | 0.3 | 0.3 | 0.3 | 0.6 | 0.6 | 0.6 | 0.6 |
| | Note-5 | | | E-4 | E-5 | | | | | | | |
| | (parts by weight) | | | 0.3 | 0.3 | | | | | | | |
| (F) Colorant | Note-6 | | | | | | | | | | F-1 | F-1 |
| | (parts by weight) | | | | | | | | | | 0.5 | 0.5 |
| Weather resistance test 1 | Crack generating time (Hrs) | | 840 | 840 | 840 | 900 | 900 | 840 | 900 | 1260 | 1140 | >1400 |
| | Surface condition 1 | 500 hr irradation | 1 | 1 | 1 | 1 | 1 | 1 | 2 | 2 | 2 | 1 |
| | | 1000 hr irradation | 2 | 3 | 3 | 2 | 2 | 3 | 4 | 4 | 4 | 3 |
| | Surface condition 2 | 500 hr irradation | 1 | 1 | 1 | 1 | 1 | 1 | 1 | 1 | 1 | 1 |
| | | 1000 hr irradation | 2 | 3 | 3 | 2 | 2 | 3 | 3 | 1 | 1 | 2 |
| Weather resistance test 2 | Crack generating time (month) | | 8 | 8 | 8 | 8 | 9 | 8 | 10 | >12 | 12 | >12 |
| | Surface condition 1 | 6 month irradation | 1 | 1 | 2 | 1 | 1 | 1 | 4 | 4 | 4 | 3 |
| | | 12 month irradation | 2 | 3 | 3 | 3 | 2 | 3 | 5 | 5 | 5 | 5 |
| | Surface condition 2 | 6 month irradation | 1 | 1 | 2 | 1 | 1 | 1 | 1 | 1 | 1 | 1 |
| | | 12 month irradation | 2 | 3 | 3 | 3 | 2 | 3 | 2 | 1 | 1 | 2 |
| Tensile test | Yield strength (kg/cm$^2$38) | | 608 | 583 | 599 | 580 | 574 | 572 | 568 | 612 | 596 | 605 |
| | Elongation (%) | | 38 | 66 | 54 | 64 | 68 | 65 | 60 | 27 | 47 | 55 |

Note-1)
B-1: methyl methacrylate resin
B-2: methyl methacrylate crosslinked particles having the methyl methacrylate resin on a graft chain
Note-2)
C-1: poly(ethylene oxide) (average molecular weight: 4000)
C-2: poly(propylene oxide) (average molecular weight: 6000)
Note-3)
D-1: 2-[2-hydroxy-3,5-bis(a,a-dimethylbenzyl)phenyl]-benzotriazole
D-2: 2-hydroxy-4-oxybenzylbenzophenone
Note-4)
E-1: bis(2,2,6,6-tetramethyl-4-piperidyl)sebacate (molecular weight: 481)
E-2: bis(1-methyl-2,2,6,6-tetramethyl-4-piperidyl)adipate (molecular weight: 453)
Note-5)
E-3: poly[(6-morpholino-s-triazine-2,4-diyl)(2,2,6,6-tetramethyl-4-piperidyl)imino]hexamethylene-[(2,2,6,6-tetramethyl-4-piperidyl)imino] (molecular weight: about 1600)
E-4: dimethyl succinate-1-(2-hydroxyethyl)-4-hydroxy-2,2,6,6-tetramethylpiperidine polycondensation product (molecular weight: 3000 or more)
E-5: tetrakis(2,2,6,6-tetramethyl-4-piperidyl)1,2,3,4-butanetetracarboxylate (molecular weight: 792)
Note-6)
F-1: carbon black

What is claimed is:

1. A polyacetal resin composition which comprises:
   (A) 100 parts by weight of a polyacetal resin,
   (B) 0.1 to 30 parts by weight of a homopolymer or copolymer of methyl methacrylate,
   (C) 0.1 to 10 parts by weight of an oxyalkylene polymer having chains of 2 to 8 consecutive carbon atoms,
   (D) 0.01 to 2.0 parts by weight of a UV absorber, and
   (E) a hindered amine additive package comprising a mixture of
     (E1) 0.01 to 1 part by weight of a low molecular weight hindered amine compound having a molecular weight of less than 700, and
     (E2) 0.01 to 4 parts by weight of a high molecular weight hindered amine compound having a molecular weight of 700 or more.

2. The composition as claimed in claim 1, in which the oxyalkylene polymer (C) is at least one member selected from the group consisting of polyethylene oxide, polypropylene oxide and a copolymer of ethylene oxide and propylene oxide.

3. The composition as claimed in claim 1, in which the UV absorber (D) is a benzotriazole compound and/or a benzophenone compound.

4. The composition as claimed in claim 1, in which the low molecular weight hindered amine compound (E 1) has a molecular weight of 600 or less.

5. The composition as claimed in claim 1, in which the high molecular weight hindered amine compound (E2) has a molecular weight of 1000 or more.

6. The composition as claimed in claim 1, wherein compound (E1) is present in an amount between 0.02 to 1 part by weight and has a molecular weight of 600 or less, and wherein compound (E2) is present in an amount between 0.02 to 2 parts by weight and has a molecular weight of 1000 or more.

7. The composition as claimed in claim 1, which further comprises (F) 0.1 to 4 parts by weight, per 100 parts by weight of the polyacetal resin, of a coloring component.

8. A polyacetal resin composition which comprises:
   (A) 100 parts by weight of a polyacetal resin;
   (B) between 0.1 to 30 parts by weight of an acrylic resin;

(C) between 0.1 to 10 parts by weight of an oxyalkylene polymer having chains of 2 to 8 consecutive carbon atoms;

(D) between 0.01 to 2.0 parts by weight of a UV absorber; and (E) a hindered amine additive package comprising a mixture of
 (E1) between 0.02 to 1 part by weight of a low molecular weight hindered amine compound having a molecular weight of less than 600 which is selected from the group consisting of bis(2,2,6,6-tetramethyl-4-piperidyl)sebacate and bis(1-methyl-2,2,6,6-tetramethyl-4-piperidyl)-adipate, and (E2) 0.03 to 2 parts by weight of a high molecular weight hindered amine compound having a molecular weight of 1000 or more selected from the group consisting of poly[(6-morpholino-s-triazine-2,4diyl)(2,2,6,6-tetramethyl-4-piperidyl)imino] hexamethylene-[2,2,6,6-tetramethyl-4-piperidyl)imino], dimethyl succinate-1-(2-hydroxyethyl)-4-hydroxy-2,2,6,6-tetramethylpiperidine polycondensation product, and tetrakis(2,2,6,6-tetramethyl-4-piperidyl) 1,2,3,4-butanetetracarboxylate.

* * * * *